Dec. 10, 1968  J. T. VERBECK  3,415,973
METHOD OF WELDING SHEET MATERIAL
Filed Feb. 8, 1966
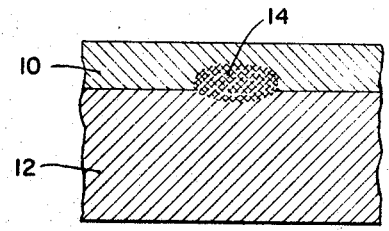
Fig.1
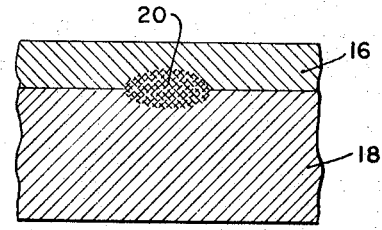
Fig.2
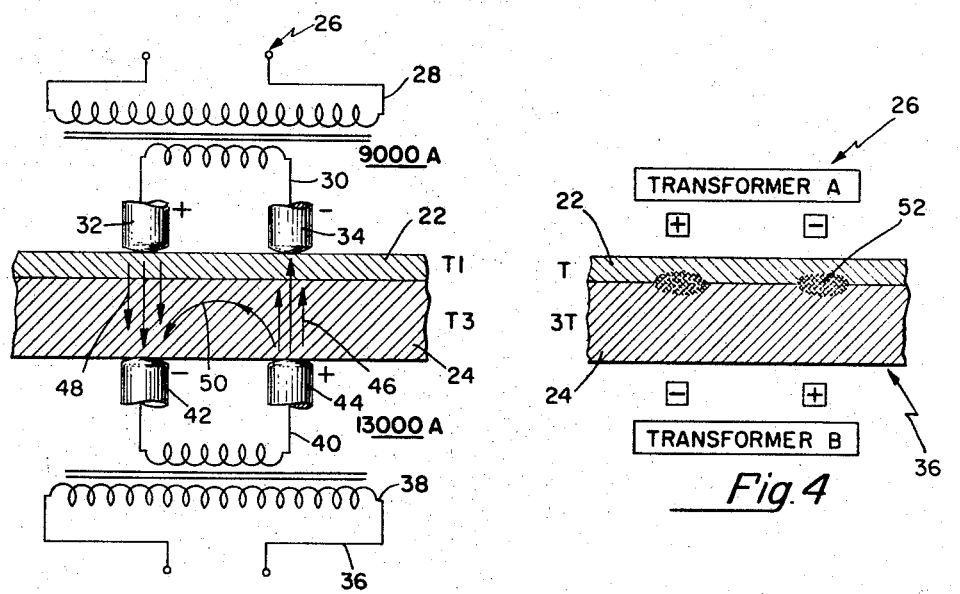
Fig.3
Fig.4
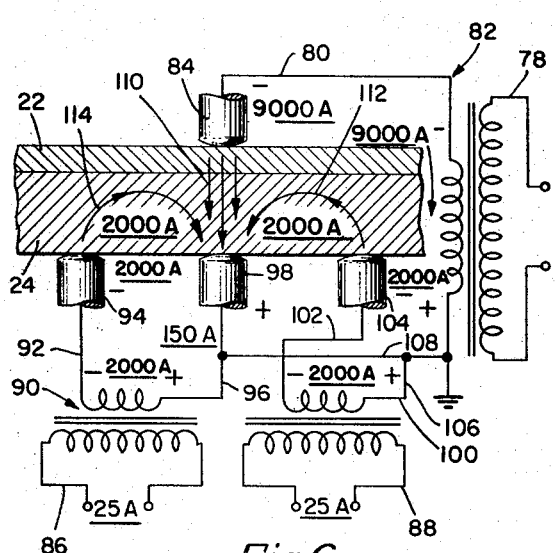
Fig.6
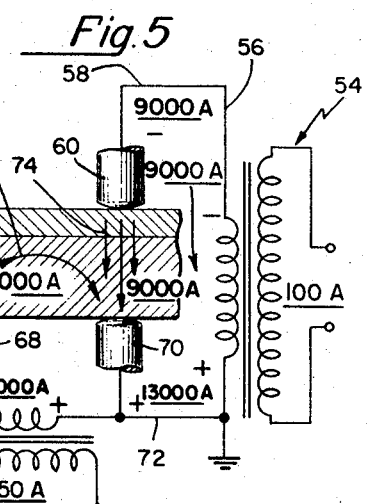
Fig.5
INVENTOR.
JOHN T. VERBECK
BY E. B. Batchelder
ATTORNEY 3,415,973
METHOD OF WELDING SHEET MATERIAL
John T. Verbeck, Glenside, Pa., assignor to The Budd Company, Philadelphia, Pa., a corporation of Pennsylvania
Filed Feb. 8, 1966, Ser. No. 525,966
5 Claims. (Cl. 219—91)

ABSTRACT OF THE DISCLOSURE

A welding system is provided for welding together two dissimilar sheets. A pair of transformers provide currents of two different levels to electrodes disposed on the sheets. Excess current not used to weld is shunted through one of the sheets.

---

The present invention relates generally to the welding together of sheets of different characteristics and more specifically to sheets of different thicknesses.

The present invention, while primarily useful for providing a uniform penetration of a weld nugget in a resistance welding technique into two superimposed sheets to be welded is also applicable to welding sheets of dissimilar materials that may or may not have different thicknesses and including, but not restricted in any way thereto, the welding of a galvanized sheet of material to a non-galvanized sheet of material.

The present invention is additionally well adapted for utilization in a push-pull technique of multiweld presses.

In present push-pull welding techniques, as used for example in automotive multiweld presses, there is a general requirement for the use of two matched transformers to connect in such a manner that a secondary cable of each transformer, of opposite polarities, is connected to the opposite sides of the same weld gun, and there may be two to four weld guns in each setup. This technique creates a secondary current flow from the negative polarity of one transformer to the positive polarity of the other transformer, and the reverse occurs in the other half of each transformer secondary to complete the circuit for both transformers.

It is a primary object of the present invention to create a method of welding sheet materials of different characteristics or thicknesses wherein certain drawbacks in previous known techniques are overcome and a far superior resultant weld is obtained, similar known welding techniques being utilized in the invention.

Additional objects and advantages of the present invention will be more readily apparent from the following detailed description of the invention and embodiments thereof when taken together with the accompanying drawings in which:

FIG. 1 is a fragmentary sectional view of a weld between material sheets of different thicknesses obtained by prior known methods and with a non-uniform weld bead;

FIG. 2 is a view similar to FIG. 1 but showing the improved weld obtained by the present invention and a uniform distribution of the weld button in the welded sheets;

FIG. 3 is a schematic view of a two gun weld system incorporating the present invention;

FIG. 4 is a fragmentary sectional view of a weld result obtained with the system of FIG. 3;

FIG. 5 is a schematic view of a modified welding system in accordance with the present invention; and FIG. 6 is a view similar to FIG. 5 showing a further modification of the invention.

While the present invention will be more readily apparent from the following described methods of practising the same, when taken together with the accompanying drawings, the primary concept of the invention resides in a method of so regulating a constant current in one of the transformers in the circuit and which exceeds the current in the other transformer. This in combination with the desired polarity creates a shunting action through the thicker of two sheets which is the difference between the magnitudes of currents in the two transformers.

In FIG. 1 of the drawings, depicting prior results of welding techniques there is shown a sheet 10 of metal and a sheet 12 of metal, of approximately three times the thickness of sheet 10 and wherein the weld was obtained by a balance transformer technique with the same secondary current level on both sheets so that the weld bead 14 has a distribution of approximately 30% penetration on the thick sheet 12. This does not result in the most desirable or strongest weld and it has also been found that the same technique in welding different materials such as, for example, carbon and galvanized steels produce like different percentage penetrations which while of good symmetry were not of equal penetration and a zinc expulsion problem existed.

In FIG. 2 the results obtained by utilization of the present invention is shown wherein sheet 16 is of approximately one-third the thickness of sheet 18 but it will be seen that the weld bead or button not only has as good symmetry but also substantially equal penetration of approximately 50% in both of the sheets of different thickness or of specifically different materials such as carbon and galvanized steels, in the latter of which very little zinc expulsion has been experienced.

FIG. 3 discloses a transformer arrangement capable of practising the present invention. In this figure sheet 22 has a thickness approximately one-third that of sheet 24 to which it is to be welded. A first welding transformer 26 has a primary circuit 28 and a secondary circuit 30, the latter of which has the output connected to welding electrodes 32 and 34, the first of which has a positive polarity as indicated and the second of which has a negative polarity as indicated, these welding electrodes being applied under appropriate pressure and time increments to the face of sheet 22 as in normal techniques. A second welding transformer 36 is utilized on the opposite side of the sheet sandwich and includes a primary circuit 38 and a secondary circuit 40, the outputs of which are respectively connected to welding electrodes 42 and 44 respectively with the polarities, as indicated, being opposite to the opposed electrodes of transformer 26. The input current to the transformer 26, on the thin sheet side, is set according to standard welding procedures such as, for example, at approximately 8,000 amperes and the power input to the transformer 36 is greater, on the thicker sheet side. This can be in the nature of approximately 13,000 amperes. The technique as utilized in the invention includes regulating the excess current on the thicker side proportional to the thickness on the thicker side. The result is a current flow as is indicated by the arrows 46 and 48 through the sheets and between the welding electrodes of different polarity. The excess current is shunted through the thick sheet without crossing over or between the sheets and electrodes as indicated by arrow 50 and is in the nature of a current of approximately 4,000 amperes.

The variable current utilized depends upon the relative thicknesses of the two sheets being welded and/or the differences in resistivity of sheets of different materials and resistances. It will be seen that the high current transformer on the thick sheet side shunts a portion of the current through the piece or sheet and results in a weld of the desired characteristics. The sheet 24 can be of galvanized steel whereas the sheet 22 can be of carbon steel and the same results are obtainable.

In FIG. 4 the results of application of the welding technique of FIG. 3 is schematically shown and it will be readily apparent that the weld buttons are evenly distributed between sheets 22 and 24. When using the different materials as referred to above it has been found that not only are good symmetrical buttons obtained but with very little zinc expulsion.

Another arrangement for practicing the invention is shown in FIG. 5 where the sheets of material 22 and 24 have been similarly designated and have approximately the same differentiation in thickness or material. In this embodiment a welding transformer 54 is utilized with a current input of approximately 100 amperes. The secondary circuit 56 of this transformer has negative lead 58 connected to an upper single welding electrode 60 which wherefore has a current of approximately 9,000 amperes negative thereto. A second welding transformer 62 is positioned below the bottom sheet 24 with an input current in the transformer of approximately 50 amperes. The secondary 64 of this transformer has its negative lead 66 connected to electrode 68 to thereby impress a current of approximately 4,000 amperes on electrode 68. A second electrode 70 is connected into the positive lead 72 of secondary 56 to thereby impress a current of approximately 13,000 amperes, positive, on electrode 70. The flow of welding current between electrodes 60 and 70 is indicated by arrows 74 and the system is operable to create a weld button similar to the foregoing described embodiments. The arrow 76 depicts a shunting of current through the thicker sheet 24 between electrodes 68 and 70 in the nature of 4,000 amperes which again is the difference between the magnitudes of currents in the two transformers 54 and 62 utilizing a proportional amount of current depending on the relative thickness of the sheet material to give the desired weld.

In FIG. 6 a still further system is shown for welding of the sheets 22 and 24 wherein a welding transformer 78 carries a secondary current of approximately 9,000 amperes. The negative lead 80 of the secondary 82 of transformer 78 is connected to upper electrode 84 and thereby impresses it with a current of 9,000 amperes negative. Additionally transformers 86 and 88 are placed beneath the lower sheet and have an input current of approximately 2,000 amperes. The secondary 90 of transformer 86 has its negative lead 92 connected to a first lower electrode 94 to thereupon impress a current of 25 amperes negative on this electrode. The positive lead 96 of transformer 86 is connected to a second, welding, electrode 98. The secondary 100 of transformer 88 has its negative lead 102 connected to a third lower electrode 104 which thereupon has a current of 2,000 amperes, negative. The positive lead 106 is connected into positive lead 108 from the secondary 82 of transformer 78 so that the resultant is a current of approximately 13,000 amperes, positive impressed on electrode 98. The welding current is indicated by arrows 110 and of approximately 9,000 amperes. Arrows 112 and 114 show a shunting in the nature of 2,000 amperes each through lower sheet 24 between electrodes 94, 104 and electrode 98 whereby the results of the present invention are again obtained and the desired weld button characteristics result.

When utilizing the present technique for welding of galvanized steel to carbon steel recognition that galvanized steel is a better conductor of current must be taken into account and the technique involves overcoming the low resistivity of the galvanized steel with a high current and the carbon steel with a lower current to thus resolve the problem of resistance welding carbon steel to galvanized steel. It was also found that a constant tap setting could be retained on the secondary of the carbon steel side transformer and the tap setting on the galvanized steel transformer could be varied such that the secondary current on the carbon steel side remained constant and the secondary current on the galvanized steel side varied according to the tap setting of the transformer. The shunting of the excess current takes place through the galvanized steel, thereby creating the required high current concentration on the galvanized steel side of the two sheets.

The method of and systems for practicing the present invention have been herein set forth in sufficient detail for one skilled in the art to practice the invention. Manifestly however minor modifications can be effected in the present invention without departing from the spirit and scope thereof as defined in and limited solely by the appended claims.

What is claimed is:

1. In a system for resistance welding of at least two sheets having different characteristics, a pair of electrodes operatively contactable with the outer face of a first said sheet, a third welding electrode operatively contactable with the outer face of a second said sheet, a first transformer connected across said pair of electrodes for applying current therethrough, a second transformer connected to provide a current path through said third electrode and one of said pair of electrodes to produce a weld between said two sheets, the current through said first transformer connected across said pair of electrodes being greater than the current required to form said weld, the excess current from said first transformer being shunted through one of said sheets between said pair of electrodes.

2. In a system as claimed in claim 1, the different sheet characteristics consisting in one said sheet having a greater thickness than the other said sheet, the excess current being applied to the thicker of said sheets.

3. In a system as claimed in claim 2, the applied currents being proportional to the difference in thickness between said sheets.

4. In a system as claimed in claim 1, the characteristic difference residing in a difference in resistivity of the materials of the two sheets, the higher current being applied to the sheet of lower resistivity.

5. In a system as claimed in claim 4, one said sheet being galvanized steel and the other said sheet being carbon steel, the higher current being applied to said galvanized sheet and the excess current being shunted through said galvanized sheet.

References Cited

UNITED STATES PATENTS

| 584,120 | 6/1897 | Payne et al. | 219—91 |
|---|---|---|---|
| 645,066 | 3/1900 | Brown et al. | 219—117 |
| 1,586,690 | 6/1926 | Murray | 219—119 |
| 2,232,450 | 2/1941 | Hagedorn | 219—91 |

RICHARD M. WOOD, *Primary Examiner.*

P. W. MAY, *Assistant Examiner.*

U.S. Cl. X.R.

219—86